(12) United States Patent
Schulz et al.

(10) Patent No.: US 7,527,225 B1
(45) Date of Patent: May 5, 2009

(54) BEND SUPPORT BRACKET FOR FLEXIBLE POLYMERIC TUBING

(75) Inventors: Karl Robert Schulz, Reno, NV (US); Marshall Henningsen, Carson City, NV (US)

(73) Assignee: LSP Products Group, Inc., Carson City, NV (US)

( * ) Notice: Subject to any disclaimer, the term of this patent is extended or adjusted under 35 U.S.C. 154(b) by 0 days.

(21) Appl. No.: 11/945,471

(22) Filed: Nov. 27, 2007

(51) Int. Cl.
*F16L 3/08* (2006.01)

(52) U.S. Cl. .............................. 248/65; 248/56; 248/71; 248/73

(58) Field of Classification Search .................... 248/65, 248/73, 56, 57, 74.1, 74.2, 71, 79; 138/110, 138/108, 106, 109
See application file for complete search history.

(56) References Cited

U.S. PATENT DOCUMENTS

| | | | | |
|---|---|---|---|---|
| 5,333,821 A * | 8/1994 | Lee | .............................. | 248/52 |
| 6,012,684 A * | 1/2000 | Umney et al. | .................. | 248/65 |
| 6,467,734 B1 * | 10/2002 | Brown et al. | ................... | 248/65 |
| 6,860,515 B2 * | 3/2005 | Inoue | ........................... | 285/93 |
| 7,434,770 B2 * | 10/2008 | Schmidt | ....................... | 248/49 |
| 2003/0094809 A1 * | 5/2003 | Inoue | ........................... | 285/93 |
| 2008/0116324 A1 * | 5/2008 | Holder | ......................... | 248/65 |

* cited by examiner

*Primary Examiner*—Amy J. Sterling
(74) *Attorney, Agent, or Firm*—Locke Lord Bissell & Liddell, LLP

(57) ABSTRACT

A bend support bracket for flexible polymeric tubing, the bracket being installable inside a wall and having an arcuate guide surface, an oppositely disposed arcuate gripping surface and a flexible attachment arm, the flexible attachment arm having a fixed end that is unitarily molded to the body, a free end that comprises a positioning groove into which a portion of an inwardly facing wall of an aperture in a bracket support strap is receivable, and an outwardly facing, arcuate biasing surface disposed between the first and second ends, wherein the application of manual pressure to the biasing surface biases the positioning groove into alignment with the aperture wall so that a portion of the aperture wall is receivable in the positioning groove.

10 Claims, 1 Drawing Sheet

BEND SUPPORT BRACKET FOR FLEXIBLE POLYMERIC TUBING

BACKGROUND OF THE INVENTION

1. Field of the Invention

This invention relates to flexible, polymeric, tubular conduits made of materials such as cross-linked polyethylene ("PEX") that are used in plumbing applications, and more particularly, to a bend support bracket that is useful for installing such flexible tubular conduits in in-wall plumbing installations.

2. Description of Related Art

In residential construction and in other plumbing applications where permitted by building codes, potable water supply lines comprising PEX tubing are frequently installed inside walls. Once the PEX line is routed to a desired position inside a wall, it is desirably bent outwardly for connection through an aperture in the wall, typically drywall, to an appliance or other end use application. To prevent a PEX line from pinching off or kinking at the point where it bends to pass through a wall, and thereby impeding the flow of water through the line, a bend support bracket is desirably provided.

One such bracket is disclosed, for example, in U.S. Pat. No. 6,467,734. With that device, however, the forward wall of the mounting flange comprises upper and lower portions defining a surface that is disposed in fixed relation to the body and is intentionally designed to be larger than the diameter of the holes or openings in a support strap with which it can be used, so that the bracket must necessarily be inserted through the strap from the front side. Also, the prior art device as disclosed in U.S. Pat. No. 6,467,734 comprises a narrow, relatively sharp, upwardly facing reinforcing rib that "digs into" the palm of the user during installation of the device.

SUMMARY OF THE INVENTION

A bend support bracket for flexible polymeric tubing is disclosed herein that is readily attachable to a bracket support strap that spans at least a portion of the space between adjacent wall studs, and is insertable through the holes in a bracket support strap from the rear, in-wall side. More particularly, the bend support bracket of the invention preferably comprises a molded polymeric body comprising a substantially flat, arcuate conduit guide surface and an oppositely facing, relatively flat, arcuate gripping surface, with two open curvilinear conduit guide members spaced apart along the conduit guide surface, and a flexible attachment arm. The flexible attachment arm preferably comprises a fixed end that is unitarily molded to the body, a free end that comprises a positioning groove into which a portion of an inwardly facing wall of an aperture in a bracket support strap is receivable, and a substantially flat, outwardly facing, arcuate biasing surface extending forwardly from the gripping surface at the fixed end. According to a particularly preferred embodiment of the invention, the biasing surface comprises a textured thumb pad disposed adjacent to the free end for use in manually biasing the positioning groove of the free end into alignment with the aperture wall so that a portion of the aperture wall is receivable therein.

The apparatus disclosed herein overcomes disadvantages experienced in the use of prior art devices.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
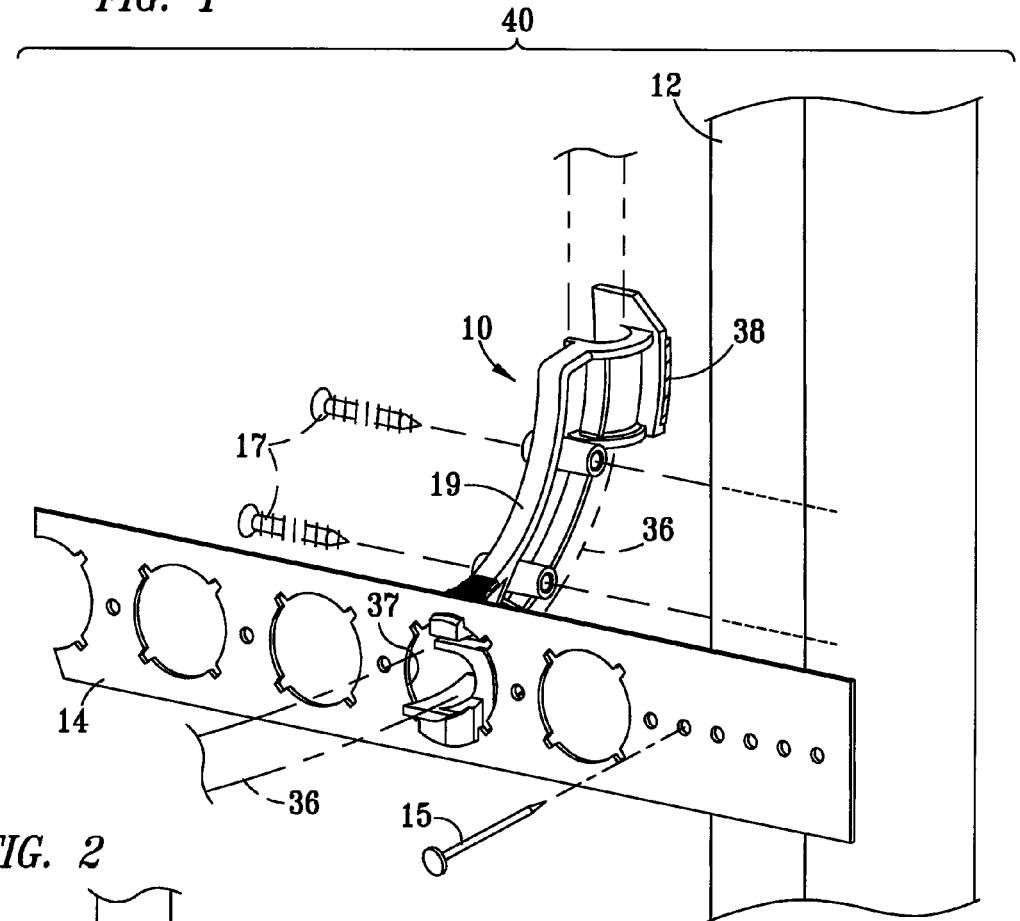
FIG. 1 is a front perspective view of an installation of a preferred embodiment of the bend support bracket of the invention to a bracket support strap or, alternatively, directly to a wall stud, with a segment of flexible polymeric tubing shown in phantom outline.
Figure 2:
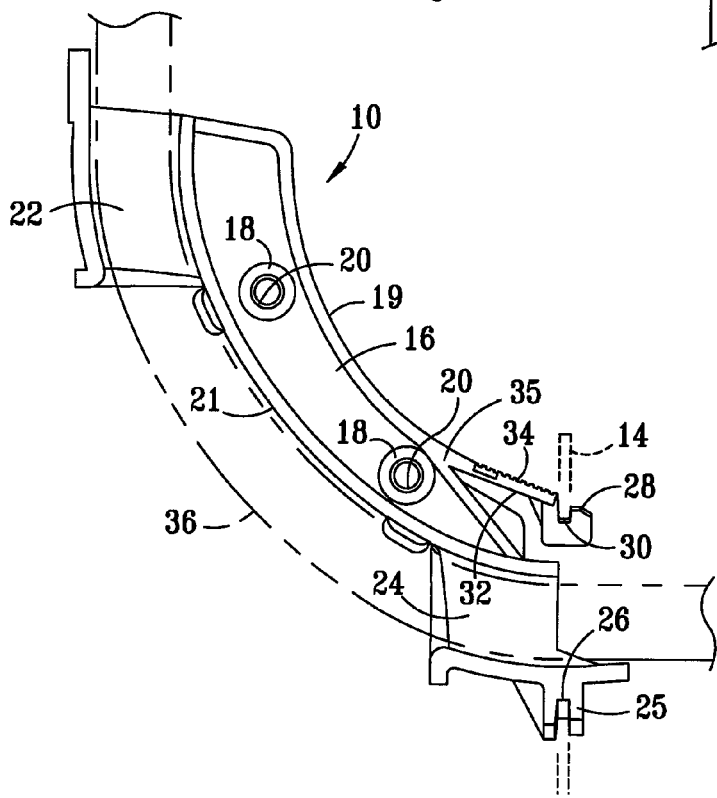
FIG. 2 is a side elevation view of the bend support bracket of FIG. 1 with a segment of flexible polymeric tubing shown in phantom outline and a cross-section a bracket support strap shown in dashed outline.

Referring to FIGS. 1 and 2, a preferred embodiment of bend support bracket 10 is depicted as it could be installed inside a wall. Bracket installation 40, which is intended to be illustrative and not the only way in which bend support bracket 10 can be used or installed, preferably comprises bend support bracket 10, wall stud 12, bracket support strap 14, and truncated segment 36 of flexible polymeric tubing (shown in phantom outline in a position in which the tubing would be disposed relative to the other elements of installation 40). Bracket support strap 14 is preferably made of metal, desirably comprises a plurality of spaced apart apertures of at least two different sizes, and is attachable to adjacent wall stud 12 using conventional, commercially available fasteners such as nail 15, or any other similarly useful fastener. Alternatively, depending upon relative positioning between tubing segment 36 and wall stud 12, bend support bracket 10 may be attachable directly to wall stud 12 in some circumstances using fasteners such as screws 17 if desired. Where bend support bracket 10 is attachable directly to wall stud 12, bracket support strap 14 may not be required.

FIG. 1 also discloses a pad 38 that is optionally disposed on a rearwardly facing surface of bend support bracket 10 to provide cushioning or acoustic insulation if desired.

Flexible polymeric tubing segment 36 is preferably made of cross-linked polyethylene ("PEX"), although the particular resin(s) employed in making tubing segment 36 can vary, and bend support bracket 10 can be used with flexible polymeric tubing having different component resins provided that bend support bracket 10 is suitably sized for the material type, diameter and wall thickness of tubing segment 36 that is used.

Referring again to FIGS. 1 and 2, bend support bracket 10 is preferably injection molded from any commercially available, moldable polymeric resin having properties suitable for use in such applications and under such conditions. Bend support bracket 10 preferably comprises a molded polymeric body 16 further comprising a substantially flat, arcuate conduit guide surface 21 with two open curvilinear conduit guide members 22, 24 spaced apart along the conduit guide surface, a substantially flat, arcuate gripping surface 19 that faces oppositely from conduit guide surface 21, and a flexible attachment arm 32. Flexible attachment arm 32 desirably has a fixed end 35 that is unitarily molded to the body, a free end 28 that comprises a positioning groove 30 into which a portion of an inwardly facing wall (shown in dashed outline) of an aperture 37 (FIG. 1) in bracket support strap 14 is receivable, and a substantially flat, arcuate biasing surface disposed between the fixed and free ends. The arcuate biasing surface is preferably disposed on the same arcuate line with gripping surface 19 and most preferably further comprises an outwardly facing, textured thumb pad 34 disposed between the fixed and free ends, whereby the application of manual pressure to textured pad 34 biases positioning groove 30 in free end 38 of the attachment arm 32 into alignment with the wall of aperture 37 so that a portion of the wall is receivable in positioning groove 30. Sufficient clearance is desirably provided between free end 28 and the closest adjacent portion(s) of body 16 to permit attachment arm 32 to flex enough so that positioning groove 30 can be positioned to receive a portion of the aperture wall during installation, and can be positioned to disengage from the aperture wall for subsequent removal if desired.

Body 16 of bend support bracket 10 preferably further comprises a plurality of spaced apart transverse aperture 20 defined by bosses 18 to facilitate the insertion of fasteners for attachment directly to a wall stud 12 as suggested by exploded screws 17 in FIG. 1 if desired.

According to a particularly preferred embodiment of the invention, body 16 of bend support bracket 10 further comprises a fixed flange member 25 disposed opposite flexible attachment arm 32, the fixed flange member 25 desirably comprising a second positioning groove 26 that is alignable with positioning groove 30 of flexible attachment arm 32, whereby a portion of the inwardly facing wall of aperture 37 in bracket support strap 14 is receivable into second positioning groove 26. When free end 28 of flexible attachment arm 32 is biased toward fixed flange member 25 by the application of manual pressure to thumb pad 34, bend support bracket 10 is desirably installable through an aperture in bracket support strap 14 from the rear.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A bend support bracket for flexible polymeric tubing, the bracket comprising a molded polymeric body further comprising a substantially flat, arcuate conduit guide surface; an oppositely facing, spaced-apart, relatively flat, arcuate gripping surface; two open curvilinear conduit guide members spaced apart along the conduit guide surface;

and a flexible attachment arm having a fixed end that is unitarily molded to the body, a free end that comprises a positioning groove into which a portion of an inwardly facing wall of an aperture in a bracket support strap is receivable, and a substantially flat, outwardly facing, arcuate biasing surface extending forwardly along the flexible attachment arm from the gripping surface of the body.

2. The bend support bracket of claim 1, further comprising a thumb pad disposed between the fixed and free ends.

3. The bend support bracket of claim 2 wherein the thumb pad is adjacent to the free end.

4. The bend support bracket of claim 2 wherein the thumb pad has a textured surface.

5. The bend support bracket of claim 1 wherein pressure applied manually to the outwardly facing, arcuate biasing surface of the flexible attachment arm biases the positioning groove in the free end of the attachment arm into alignment with the aperture wall so that a portion of the aperture wall is receivable in the positioning groove.

6. The bend support bracket of claim 1 in combination with a bracket support strap attachable to a wall stud.

7. The bend support bracket of claim 1 wherein the body further comprises a fixed flange member disposed opposite the flexible attachment arm, the fixed flange member comprising a second positioning groove alignable with the positioning groove of the flexible attachment arm, whereby a portion of the inwardly facing wall of the aperture in the bracket support strap is receivable into the second positioning groove.

8. The bend support bracket of claim 1 wherein the positioning groove of the flexible attachment arm is releasable from the aperture of the bracket support strap upon the application of manual pressure to the arcuate biasing surface of the flexible attachment arm.

9. The bend support bracket of claim 1 wherein the body further comprises at least one boss through which a fastener is insertable to fasten the body directly to a wall stud.

10. The bend support bracket of claim 7 wherein the bracket support strap has an in-wall side, and wherein the free end of the flexible attachment arm can be manually biased toward the fixed flange member sufficiently to permit attachment of the bend support bracket to the bracket support strap from the in-wall side of the bracket support strap.

* * * * *